US007058952B1

(12) United States Patent
Garth et al.

(10) Patent No.: US 7,058,952 B1
(45) Date of Patent: Jun. 6, 2006

(54) TECHNIQUE FOR DETERMINING AN OPTIMAL NUMBER OF TASKS IN A PARALLEL DATABASE LOADING SYSTEM WITH MEMORY CONSTRAINTS

(75) Inventors: John Marland Garth, Gilroy, CA (US); James Alan Ruddy, Gilroy, CA (US); Akira Shibamiya, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/501,493

(22) Filed: Feb. 9, 2000

Related U.S. Application Data

(63) Continuation-in-part of application No. 09/061,596, filed on Apr. 16, 1998, now Pat. No. 6,272,486.

(51) Int. Cl.
*G06F 9/46* (2006.01)

(52) U.S. Cl. .......................................... 718/105; 707/2
(58) Field of Classification Search ................ 709/105, 709/104, 107, 102; 707/7, 2, 101, 1, 100, 707/3; 711/158, 202; 712/203, 216
See application file for complete search history.

(56) References Cited

U.S. PATENT DOCUMENTS

| | | | | |
|---|---|---|---|---|
| 4,847,830 A * | 7/1989 | Momirov | ...................... | 370/400 |
| 4,920,487 A * | 4/1990 | Baffes | ........................ | 709/105 |
| 5,191,578 A * | 3/1993 | Lee | ............................. | 370/418 |
| 5,202,987 A * | 4/1993 | Bayer et al. | ................. | 709/102 |
| 5,222,235 A * | 6/1993 | Hintz et al. | .................. | 707/101 |
| 5,307,485 A * | 4/1994 | Bordonaro et al. | ............. | 707/7 |
| 5,761,667 A * | 6/1998 | Koeppen | ...................... | 707/101 |
| 5,765,202 A * | 6/1998 | Kusano et al. | ............... | 711/202 |
| 5,781,752 A * | 7/1998 | Moshovos et al. | ........... | 712/216 |
| 5,797,000 A * | 8/1998 | Bhattacharya et al. | ......... | 707/2 |
| 5,813,004 A * | 9/1998 | Meck et al. | .................... | 707/7 |
| 5,842,207 A * | 11/1998 | Fujiwara et al. | ................ | 707/7 |
| 5,842,208 A * | 11/1998 | Blank et al. | .................... | 707/7 |
| 5,860,137 A * | 1/1999 | Raz et al. | ..................... | 711/202 |
| 5,878,241 A * | 3/1999 | Wilkinson et al. | ........... | 712/203 |
| 5,898,870 A * | 4/1999 | Okuda et al. | ................ | 718/104 |
| 5,968,115 A * | 10/1999 | Trout | .......................... | 709/107 |
| 5,987,468 A * | 11/1999 | Singh et al. | .................. | 707/100 |
| 6,026,394 A * | 2/2000 | Tsuchida et al. | ................ | 707/3 |
| 6,073,131 A * | 6/2000 | Roberti | ........................... | 707/7 |
| 6,125,370 A * | 9/2000 | Courter et al. | ............... | 707/202 |
| 6,173,306 B1 * | 1/2001 | Raz et al. | .................... | 709/102 |
| 6,216,125 B1 * | 4/2001 | Johnson | .......................... | 707/4 |
| 6,269,375 B1 * | 7/2001 | Ruddy et al. | ................ | 707/101 |
| 6,272,486 B1 * | 8/2001 | Garth et al. | .................... | 707/2 |

(Continued)

OTHER PUBLICATIONS

"Resource Management System for Multimedia Devices", IBM Technical Disclosure Bulletin, Sep. 1, 1993, US.*

*Primary Examiner*—Lewis A. Bullock, Jr.
(74) *Attorney, Agent, or Firm*—Gates & Cooper LLP

(57) ABSTRACT

A method, apparatus, and article of manufacture of a computer-implemented parallel database loading system. The optimum number of tasks to be processed by the system is determined by identifying the memory constraints of the system, by identifying available processing capabilities, and by determining a number of load and sort processes to be started in parallel based on the identified memory constraints and processing capabilities. Optimizing the number of load and sort processes increases overall system processing speed.

24 Claims, 9 Drawing Sheets

U.S. PATENT DOCUMENTS

| | | | |
|---|---|---|---|
| 6,292,822 B1 * | 9/2001 | Hardwick | 709/105 |
| 6,295,539 B1 * | 9/2001 | Isip, Jr. | 707/201 |
| 6,311,265 B1 * | 10/2001 | Beckerle et al. | 712/203 |
| 6,366,911 B1 * | 4/2002 | Christy | 707/7 |
| 6,366,945 B1 * | 4/2002 | Fong et al. | 709/104 |
| 6,415,366 B1 * | 7/2002 | Chen et al. | 711/158 |
| 6,427,143 B1 * | 7/2002 | Isip et al. | 707/1 |
| 2001/0011268 A1 * | 8/2001 | Tsuchida et al. | 707/2 |
| 2002/0065793 A1 * | 5/2002 | Arakawa et al. | 707/1 |
| 2004/0005046 A1 * | 1/2004 | Deo et al. | 379/220.01 |

* cited by examiner

TECHNIQUE FOR DETERMINING AN OPTIMAL NUMBER OF TASKS IN A PARALLEL DATABASE LOADING SYSTEM WITH MEMORY CONSTRAINTS

This application is a continuation-in-part under 35 U.S.C. §120 of and commonly-assigned application Ser. No. 09/061,596 filed Apr. 16, 1998 now U.S. Pat. No. 6,272,486, issued Aug. 7, 2001, to Garth et al., and entitled DETERMINING THE OPTIMAL NUMBER OF TASKS FOR BUILDING A DATABASE INDEX.

BACKGROUND OF THE INVENTION

1. Field of the Invention

This invention relates in general to computer-implemented database systems, and, in particular, to a technique for optimizing a number of tasks to be executed in a parallel database loading system.

2. Description of Related Art

Databases are computerized information storage and retrieval systems. A Relational Database Management System (RDBMS) is a database management system (DBMS) that uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

A table can be divided into partitions, with each partition containing a portion of the table's data. Each partition may reside on a different data storage device. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

In an attempt to speed up the loading of data, various approaches have been tried involving the use of parallel processing. Parallel processing exploits the multiprocessor capabilities of modern high speed computers and refers to the use of several processors to load data into different parts of the database in parallel with each other. That is, data is loaded into different partitions of a database by load utilities that are executing concurrently. In particular, the data to be loaded into the database is sorted and then separated into multiple input files. Then, a load utility may load data into a tablespace (i.e., read data from an input file and store the data in a tablespace).

However, conventional techniques for loading databases in parallel do not fully utilize the resources of the hosting parallel database loading system. Because parallel load processes only operate on a single partition and a single input file at a time, the processing capabilities of the particular host system need to be taken into account in order to optimize the speed at which databases are loaded. Past loading techniques fail to optimize the tasks required to load a database, and as such, unnecessarily slow processing times result.

Therefore, there is a need in the art for an improved technique for optimizing a number of tasks to be invoked simultaneously in a parallel database loading system.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented technique for optimizing a number of tasks to be executed in a parallel database loading system.

In accordance with the present invention, the number of parallel load operations to load data into a data store connected to a computer is optimized by identifying the memory constraints of the computer environment employed, identifying the available processing capabilities of the computer system, and determining a number of load and sort processes to be started in parallel based on the identified memory constraints and processing capabilities.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
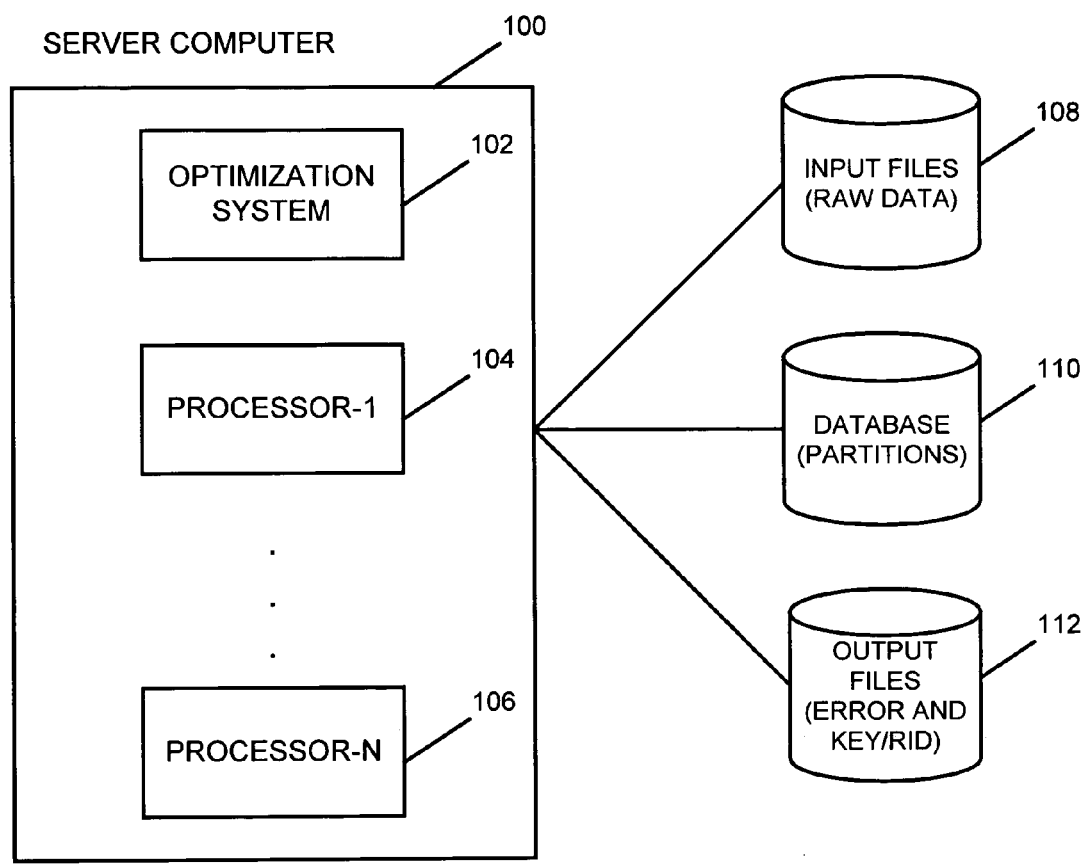
FIG. 1 is a diagram illustrating a computer hardware system that could be employed in accordance with the present invention.

FIG. 1 is a diagram illustrating a computer hardware environment that could be used in accordance with the present invention. A computer server 100 comprises an optimization system 102 and multiple processors (Processor-1 104 and Processor-N 106). The computer server 100 is connected to data stores, including data store 108, which stores input files of raw data to be stored into a database, data store 110, which stores partitions of a database, and data store 112, which stores output files for holding error information and key/RID information. Under the direction of the optimization system 102, a load process at each processor 104, 106 loads data from an input file 108 into a database 110, while storing information in the output files 112. Although the input file, the database, and the output files have been illustrated at different data stores, it is to be understood that they may all be stored on one data store or in some combination at multiple data stores (e.g., with the input and output files at one data store and the database at another data store).

Figure 2:
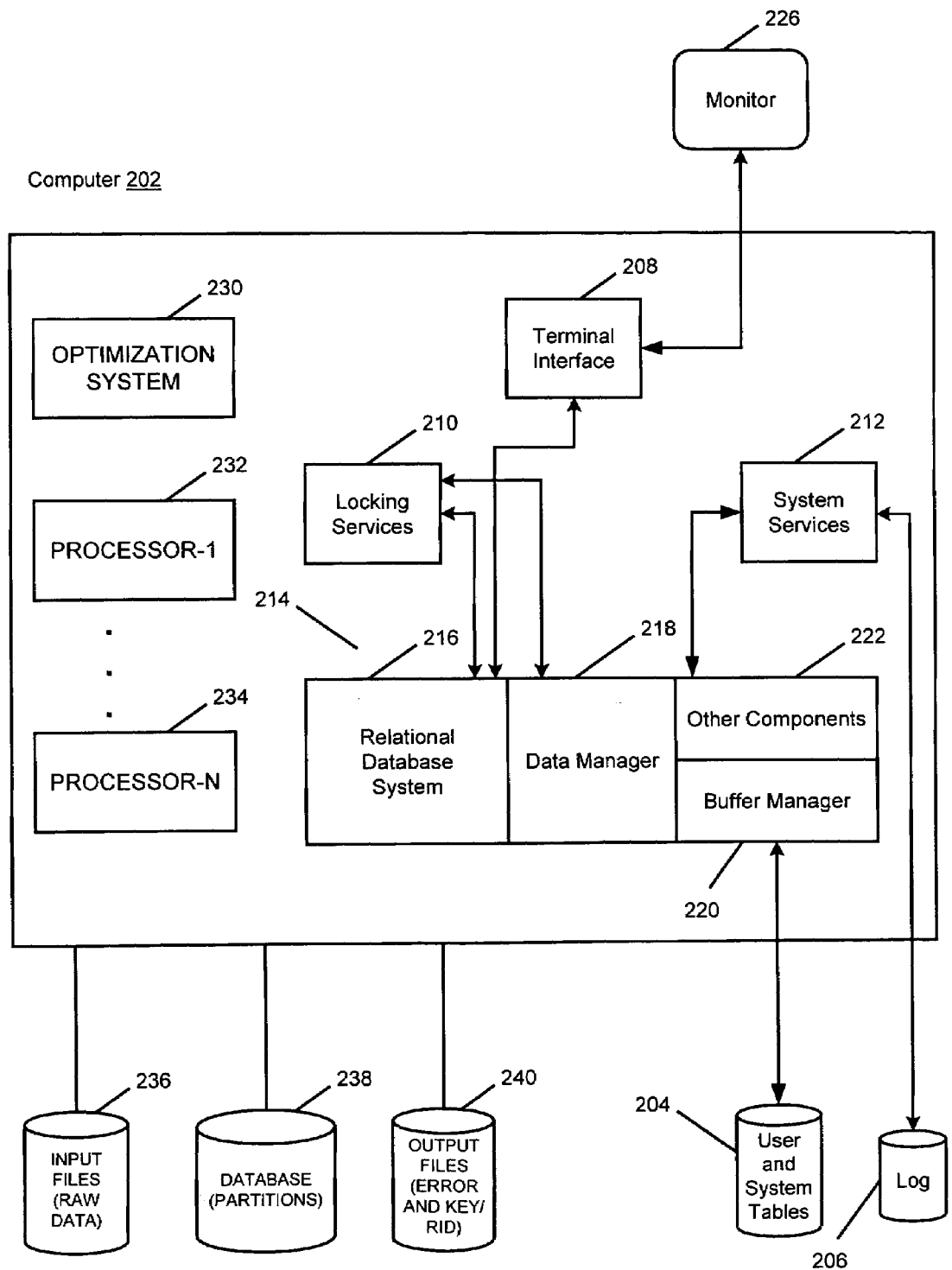
FIG. 2 is a detailed diagram of the computer hardware system of FIG. 1.

FIG. 2 is a diagram illustrating a computer hardware environment that adds further detail to the hardware environment of FIG. 1. In the environment, a computer system 202 is comprised of one or more processors 232, 234 connected to one or more data storage devices 204 and 206 that store one or more relational databases in tablespaces. The data storage devices 204 and 206 may comprise a fixed or hard disk drive, a floppy disk drive, a CDROM drive, a tape drive, or other device.

Operators of the computer system 202 use a standard operator interface 208, such as IMS/DB/DC®, CICS®, TSO®, OS/390®, ODBC® or other similar interface, to transmit electrical signals to and from the computer system 202 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In an embodiment of the present invention, the RDBMS software comprises the DB2® product offered by IBM for the OS/390® operating systems. Those skilled in the art will recognize, however, that the present invention has application to any RDBMS software, whether or not the RDBMS software uses SQL.

As illustrated in FIG. 2, the DB2® system for the OS/390® operating system includes three major components: the Internal Resource Lock Manager (IRLM) 210, the Systems Services module 212, and the Database Services module 214. The IRLM 210 handles locking services for the DB2® system, which treats data as a shared resource, thereby allowing any number of users to access the same data simultaneously. Thus concurrency control is required to isolate users and to maintain data integrity. The Systems Services module 212 controls the overall DB2® execution environment, including managing log data sets 206, gathering statistics, handling startup and shutdown, and providing management support.

At the center of the DB2® system is the Database Services module 214. The Database Services module 214 contains several submodules, including the Relational Database System (RDS) 216, the Data Manager 218, the Buffer Manager 220, and other components 222 such as an SQL compiler/interpreter. These submodules support the functions of the SQL language, i.e. definition, access control, interpretation, compilation, database retrieval, and update of user and system data.

The computer system 202 comprises an optimization system 230 and multiple processors (Processor-N 232 and Processor-N 234). The computer system 202 is also connected to a data store 236, which stores input files of raw data to be stored into a database, data store 238, which stores a database, and data store 240, which stores output files for holding error information and key/RID information.

The present invention is generally implemented using load control statements executed under the control of the Database Services module 214. The Database Services module 214 retrieves or receives the load control statements, wherein the load control statements are generally stored in a text file on the data storage devices 204 and 206 or are interactively entered into the computer system 202 by an operator sitting at a monitor 226 via operator interface 208. The Database Services module 214 and the Optimization System 230 then derive or synthesize instructions from the load control statements for execution by the computer system 202.

Generally, the RDBMS software, the load control statements, and the instructions derived therefrom, are all tangibly embodied in a computer-readable medium, e.g. one or more of the data storage devices 204 and 206. Moreover, the RDBMS software, the load control statements, and the instructions derived therefrom, are all comprised of instructions which, when read and executed by the computer system 202, causes the computer system 202 to perform the steps necessary to implement and/or use the present invention. Under control of an operating system, the RDBMS software, the load control statements, and the instructions derived therefrom, may be loaded from the data storage devices 204 and 206 into a memory of the computer system 202 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 2 is not intended to limit the present invention. Indeed, those skilled in the art will recognize that other alternative hardware environments may be used without departing from the scope of the present invention.

Technique for Determining an Optimal Number of Tasks in a Parallel Database Loading System with Memory Constraints An embodiment of the invention provides an optimized parallel database loading system referred to herein as an optimization system 230. In particular, the optimization system 230 optimizes a number of load and sort processes to be invoked simultaneously based on several factors, such as processing capabilities, overall and individual process memory constraints, the number of partitions and the number of indexes.

Figure 3:
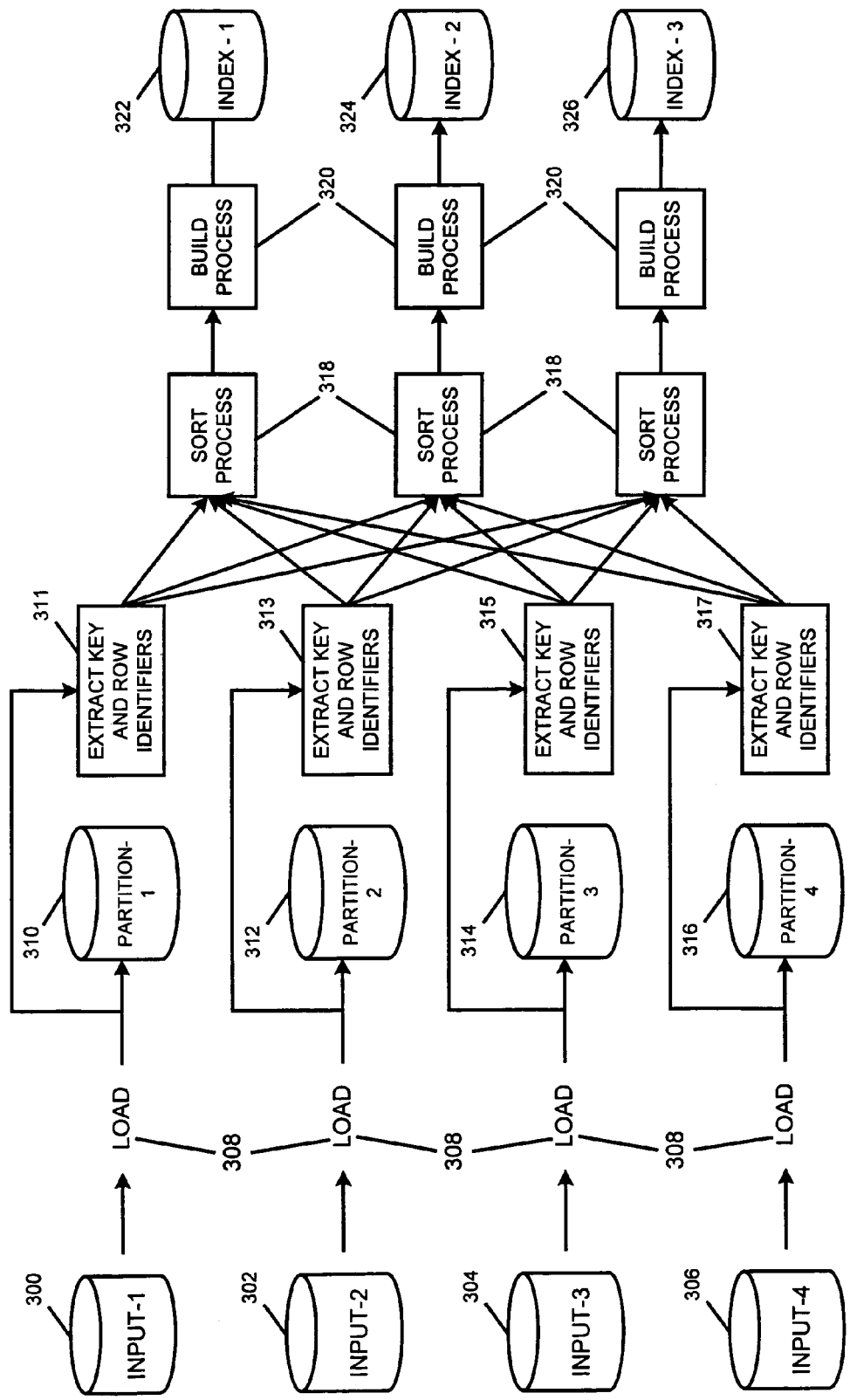
FIG. 3 is a diagram illustrating loading, partitioning, sorting, building, and indexing of data in the hardware system of FIG. 2.

The system shown in FIG. 3, illustrates a database with four partitions 310, 312, 314, 316 and input data in separate files 300, 302, 304, 306. It should be recognized by the skilled artisan that the number of partitions and separate input files may be varied to accommodate differing data structures. Data is loaded into the partitions by parallel load processes, each operating on a single partition and single input file at a time. The database is indexed, and as rows of data are loaded 308, index keys and row identifiers are extracted 317 and piped to the parallel sort processes 318. The sorted keys and row identifiers are then piped to parallel build processes 320 that build concatenated indexes 322, 324, 326.

The optimization system 230 optimizes the number of load, sort and build processes to be executed in parallel, based on the constraints imposed by the available hardware. For example, the number of sort processes is limited by the number of build processes and vice versa. Note that one build process is used to build one index. This mutual limitation exists because fewer number of sort processes results in multiple sort process sorting keys belonging to one index. Such an arrangement emits sorted keys sorted first by the index, so there are keys piped to multiple build processes. This only allows one of the build processes to be active at a time, thereby negating any increased processing times associated with initiating additional build processes.

Additionally, build processes cannot start processing keys until all of the keys have been sorted (i.e., sort processes are said to be "blocking"). When sorting is finished, the load processing will have already finished. This relationship insures that load, sort, and build processes are never simultaneously active, and thus for one instant in time, it is the number of load and sort processes that is the limiting factor for the overall parallel database processing speed. Given this relationship, optimizing the number of load and sort processes will optimize the processing speed.

Four constraints govern the number of processes to be started:
1. The number of sort processes cannot exceed the number of indexes to be built.
2. The number of load processes cannot exceed the number of partitions to be loaded.
3. The sum of the number of sort processes and the number of load processes cannot exceed the processing capabilities of the server.
4. The memory used by the sort and load processes cannot exceed the amount of memory available for these processes.

With the first two constraints, $N_S$ is the number of sort processes, $N_L$ is the number of load processes, $N_I$ is the number of indexes to be built, and $N_P$ is the number of partitions to be loaded. The relationship of these factors, can be expressed by the following:

$$N_S <= N_I, \text{ and } N_L <= N_P$$

The third constraint can be expressed by the relationship:

$$N_L + N_S <= mP$$

In the above relationship, e.g., P is the number of processors available on the server, and m is a multiplier that is a function of the speed of the processors. Although the loading and sorting processes are processor intensive operations, increased CPU speeds permit simultaneous handling of multiple processes.

The fourth constraint can be expressed by the relationship:

$$aN_L + bN_S + c < M$$

In the above relationship, e.g., M is the amount of available memory, a is the amount of memory required for each load process, b is the amount of memory required for each sort process, and c is the amount of memory required for a main process that directs the load, sort, and build processes.

Figure 4:
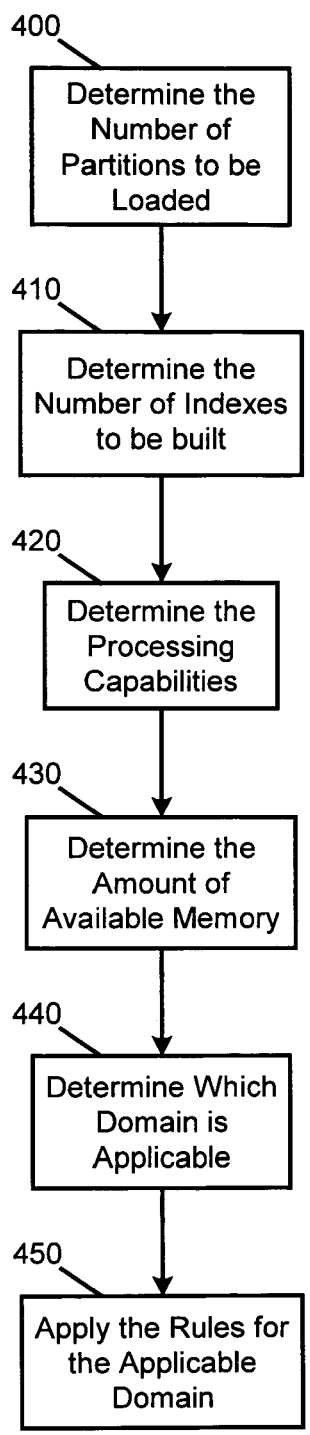
FIG. 4 is a flow-chart illustrating the process flow for the system of FIG. 1.

FIG. 4 is a flow diagram illustrating the technique performed by the optimization system 230. The optimization system 230 begins by determining the number of partitions to be loaded 400. Next, the number of indexes to be built is determined 410. The optimization system then considers the processing capabilities 420 available to it which is a function of the number of processors and the speed of the processors. Next, the amount of available memory 430 available to implement the optimized technique is determined. With all of the above information, the optimization system 230 then determines which of three domains representing a set of constraints should apply 440. Once the applicable domain is established, the rules for that domain are applied 450 to optimize system performance.

Figure 5A:
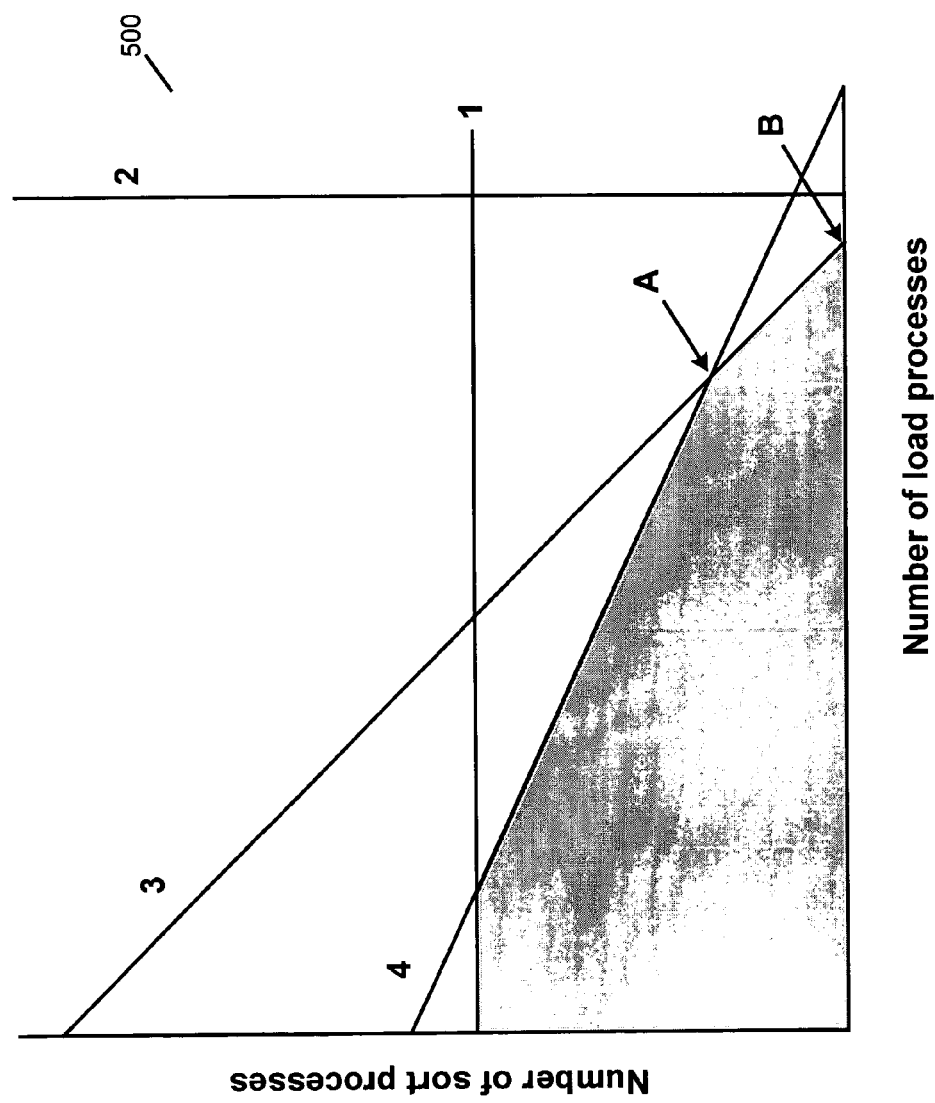
FIG. 5A is a graph illustrating a first relationship of constraints for the system of FIG. 2.

The relationship between the various system constraints is expressed graphically and is seen in FIGS. 5A–7B. FIG. 5A illustrates a first domain 500 which represents an arrangement of the above enumerated constraints where the number of partitions being loaded is sufficiently large so as to not limit the number of load processes. Line 1 represents the number of indexes, line 2 represents the number of partitions being loaded, line 3 represents the processing capabilities of the processors, and line 4 represents the memory constraints of the system. The slope of line 4 is negative because the amount of memory required for sort processes is larger than the amount of memory required for load processes (b>a).

The shaded area in FIG. 5A, represents the possible combinations of sort processes and load processes that are permitted given the above enumerated constraints. The point of intersection of lines 3 and 4, labeled A, represents the maximum number of sort processes that can be started with the number of processors constraint. The points on line 3 between point A and a point labeled B represent other combinations of numbers of sort and load processes that while maximizing the total number of processes, have fewer sort processes and more load processes. Points in the shaded area to the left of and above point A represent combinations of numbers of sort and load processes where the number of sort processes is larger than that at point A, but where the total number of processes is not maximized.

Figure 5B:
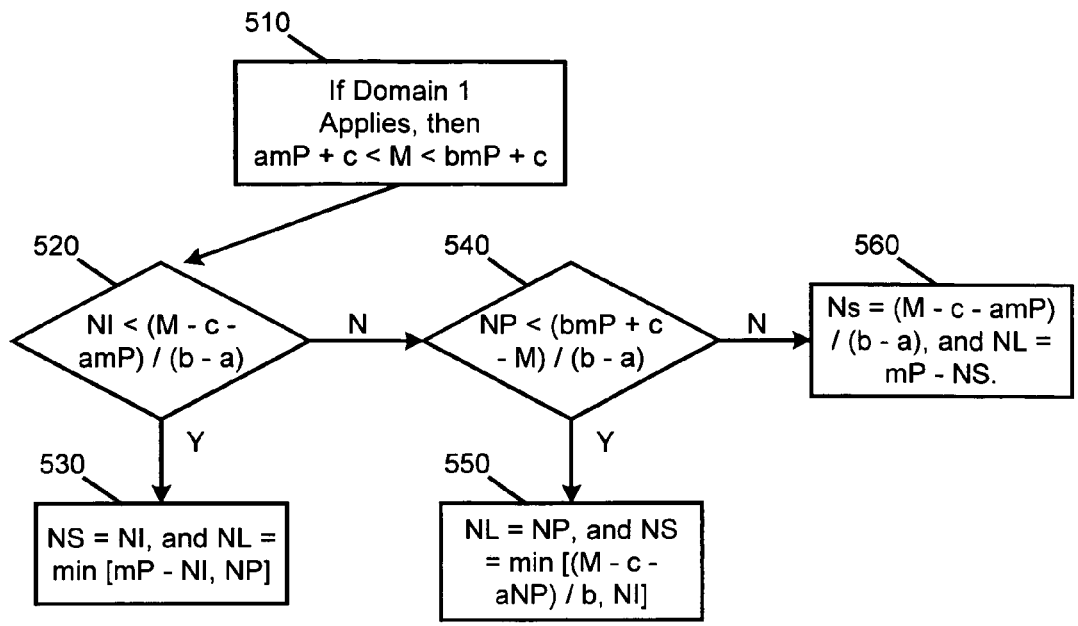
FIG. 5B is a flowchart illustrating the process flow for the relationship of FIG. 5A.
Figure 6B:
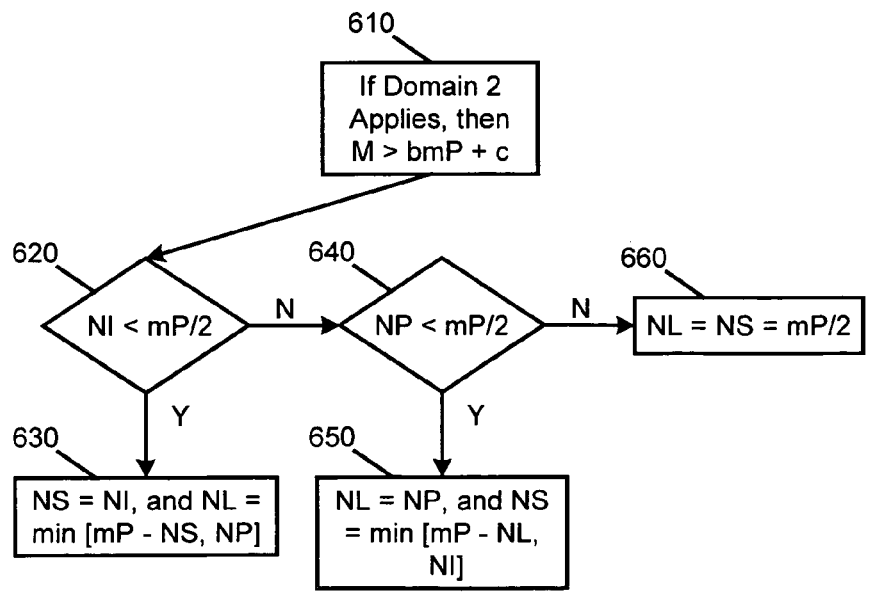
FIG. 6B is a flowchart illustrating the process flow for the relationship of FIG. 6A.

The relationship illustrated in FIG. 5A can be additionally described by the following relationship which is illustrated in a flow chart in FIG. 5B:

$$amP + c < M < bmP + c \quad \text{(See Block 510)}$$

To achieve optimal performance for the system illustrated in FIG. 5A, the number of sort and load processes should be equal because their respective burdens on the processors are approximately equal. The additional constraints and the need to maximize the total number of processes places the optimal point at point A.

The number of sort and load processes at point A can be calculated by the following technique:

1. If $N_I < (M - c - amP)/(b - a)$ (520)

then $N_S = N_I$, and $N_L = \min[mP - N_I, N_P]$; or (530)

2. If $N_P < (bmP + c - M)/(b - a)$ (540)

then $N_L = N_P$, and $N_S = \min[(M - c - aN_P)/b, N_I]$; or (550)

3. Else $N_S = (M - c - amP)/(b - a)$, and $N_L = mP - N_S$. (560)

If the first domain applies and the number of indexes is less than the difference of the total amount of available memory, the amount of memory required for a main process, and the amount of memory required for each load process multiplied by the processing capabilities, divided by the difference of the amount of memory required for each sort process and each load process 520, then the optimal point is reached when the number of sort processes is equal to the number of indexes, with the number of load processes equal to the smaller of the difference of the processing capabilities and the number of indexes, and the number of partitions.

If the first domain applies and the above condition does not apply, and the number of partitions is less than the difference of the sum of the amount of memory required for each sort process multiplied by the processing capabilities, the total amount of memory required for a main process, and the amount of memory required for each load process, divided by the difference of the amount of memory required for each sort process and each load process 540, then the optimal point is reached when the number of load processes is equal to the number of partitions and the number of sort processes is equal to the smaller of the difference of the total amount of available memory, the amount of memory required for the main process, and the amount of memory for each load process multiplied by the number of partitions, divided by the memory required for each sort process, and the number of indexes.

If the first domain applies and neither of the above two conditions applies, then the optimal point is reached when number of sort processes is equal to the difference of the total amount of available memory, the amount of memory required for a main process, and the amount of memory required for each load process, divided by the difference of the amount of memory required for each sort process and each load process, and when the number of load processes is equal to the difference of the processing capabilities and the number of sort processes 560.

Figure 6A:
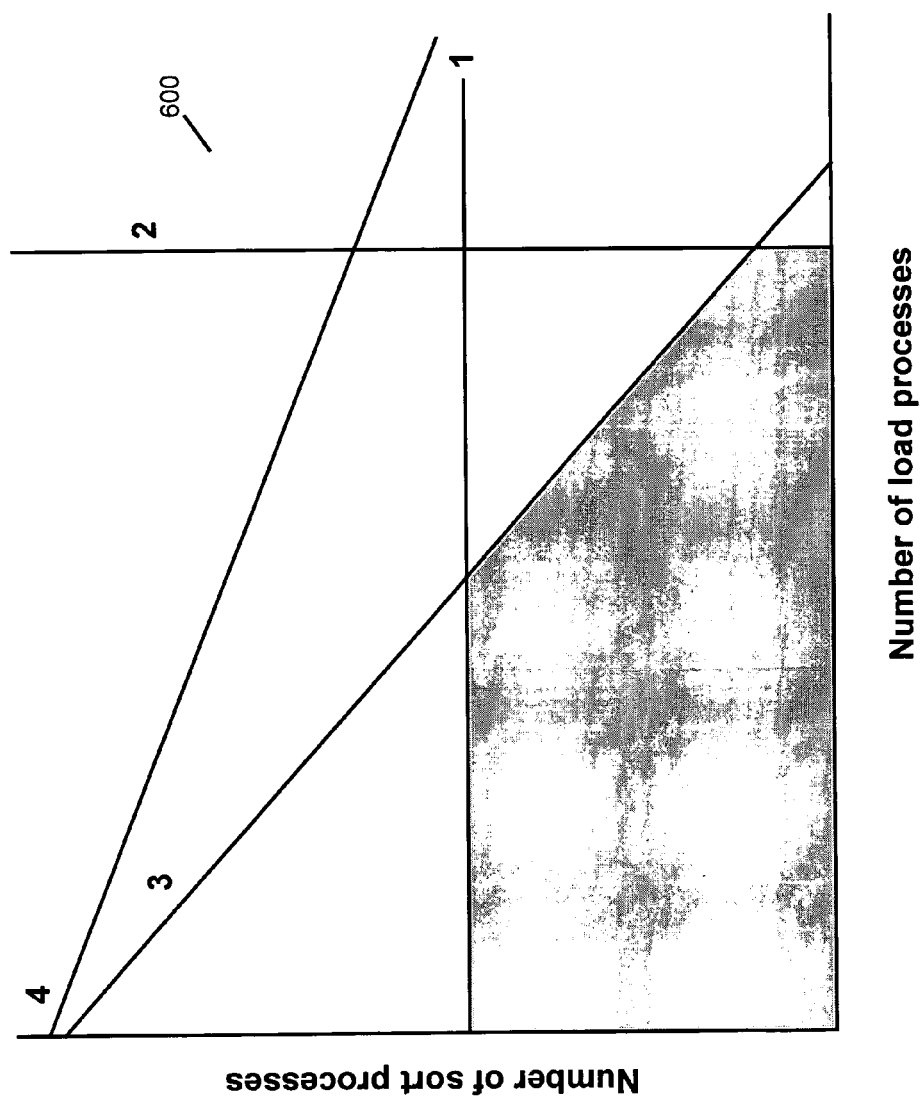
FIG. 6A is a graph illustrating a second relationship of constraints for the system of FIG. 2.

FIG. 6A illustrates a second domain 600 in which there are no memory constraints. Here, the numbered lines represent the same values and the optimal mix of processes is achieved by attempting to equalize $N_L$ and $N_S$. In this example, there is sufficient memory so that there is no memory-related constraint on the number of processes and the shaded area is bounded by the constraints for the number of indexes, the processing capabilities, and the number of partitions being loaded. This can be expressed by the following relationship which is illustrated in a flow chart in FIG. 6B:

$$M > bmP + c \quad (610)$$

The optimization system 230 determines the optimal point by the following technique:

1. If $N_I < mP/2$, (620)

then $N_S = N_I$, and $N_L = \min [mP - N_S, N_P]$; or (630)

2. If $N_P < mP/2$, (640)

then $N_L = N_P$, and $N_S = \min [mP - N_L, N_I]$; or (650)

3. Else $N_L = N_S = mP/2$. (660)

If the second domain applies and the number of indexes is less than half of the processing capabilities 620, then the optimal point is reached when the number of sort processes is equal to the number of indexes and the number of load processes is equal to the smaller of the difference of the processing capabilities available for the load processes and the number of sort processes, and the number of partitions.

If the second domain applies and the number of partitions is less than half of the processing capabilities 640, then the optimal point is reached when the number of load processes is equal to the number of partitions and the number of sort processes is equal to the smaller of the difference of the processing capabilities available for the sort processes and the number of load processes, and the number of indexes.

Otherwise, if neither of the two above conditions are present for the second domain, then the optimal point is when the number of load processes is equal to the number of sort processes and which is equal to half of the processing capabilities 660. In one embodiment, the processing requirements for loading and sorting are equal, but it should be recognized by one of ordinary skill in the art that the respective processing requirements for loading and sorting may be different depending on the system utilized, thereby shifting the optimal point to a point where the number of load processes and sort processes are not equal.

Figure 7A:
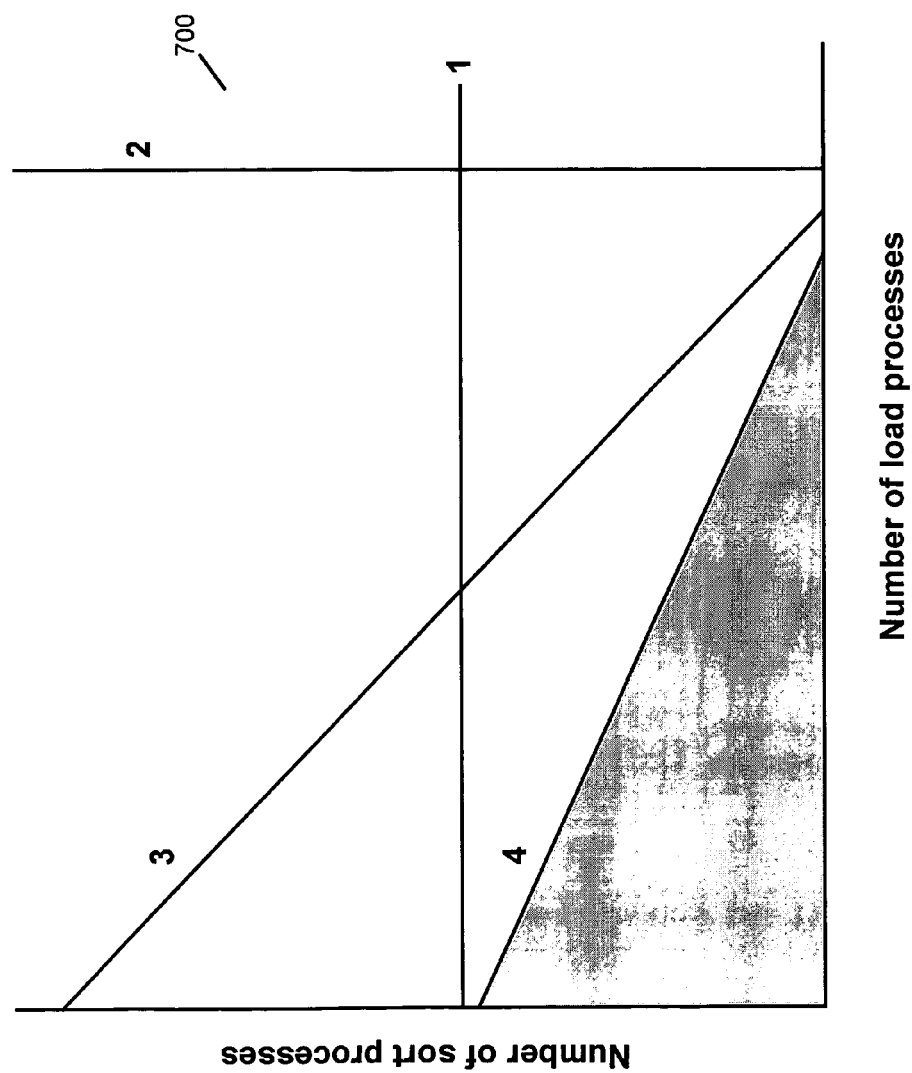
FIG. 7A is a graph illustrating a third relationship of constraints for the system of FIG. 2.
Figure 7B:
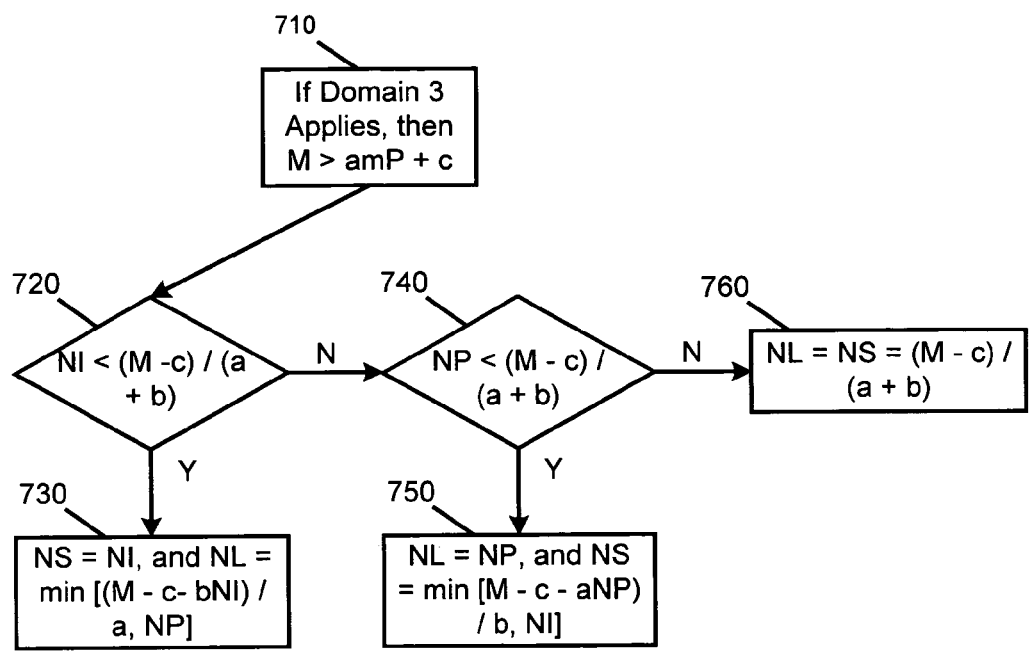
FIG. 7B is a flowchart illustrating the process flow for the relationship of FIG. 7A.

In a third domain 700 illustrated in FIG. 7A, there is insufficient available memory to start mP total processes and so the shaded area is bound solely by the memory constraints. This relationship is illustrated in FIG. 7B:

$$M < amP + c \quad (710)$$

In this case, the optimization system 230 determines the optimal point by the following technique:

1. If $N_I < (M-c)/(a+b)$ (720)

then $N_S = N_I$, and $N_L = \min [(M-c-bN_I)/a, N_P]$; or (730)

2. If $N_P < (M-c)/(a+b)$ (740)

then $N_L = N_P$, and $N_S = \min [M-c-aN_P)/b, N_I]$; or (750)

3. Else $N_L = N_S = (M-c)/(a+b)$. (760)

If it is determined that the third domain applies and if the number of indexes is less than the difference of the total amount of available memory and the amount of memory required for a main process, divided by the amount of memory required for each load and sort process 720, then the optimal point is reached when the number of sort processes is equal to the number of indexes with the number of load processes equal to the smaller of the difference of a total amount of available memory and the amount of memory required for the main process, and the amount of memory for each sort process multiplied by the number of indexes, divided by the memory required for each load process, and the number of partitions.

If the third domain applies and the number of partitions is less than the difference of the total amount of available memory and the amount of memory required for a main process, divided by the amount of memory required for each load and sort process 740, then the optimal point is reached when the number of load processes is equal to the number of partitions with the number of sort processes equal to the smaller of the difference of the total amount of available memory, the amount of memory required for the main process, and the amount of memory for each load process multiplied by the number of partitions, divided by the memory required for each sort process, and the number of indexes.

If the third domain applies, and neither of the two conditions described above are present, then the optimal point is reached when the number of load processes is equal to the number of sort processes which is equal to the difference of the total amount of memory available and the amount of memory required for a main process, divided by the amount of memory required for each load and sort process 230. In one embodiment, the processing requirements for loading and sorting are equal, but it should be recognized by one of ordinary skill in the art that the respective processing requirements for loading and sorting may be different depending on the system utilized, thereby shifting the optimal point to a point where the number of load processes and sort processes are not equal.

CONCLUSION

This concludes the description of an embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of loading data into a data store connected to a computer, the method comprising the steps of:
   identifying memory constraints;
   identifying processing capabilities; and
   determining a number of load and sort processes to be started in parallel based on the identified memory constraints and processing capabilities, wherein a number of indexes is less than half of the processing capabilities, wherein a number of sort processes is equal to the number of indexes, and further comprising determining that a number of load processes is the smaller of the difference of the processing capabilities available for the load processes and the number of sort processes, and a number of partitions.

2. A computer-implemented method of loading data into a data store connected to a computer, the method comprising the steps of:
   identifying memory constraints;
   identifying processing capabilities; and
   determining a number of load and sort processes to be started in parallel based on the identified memory constraints and processing capabilities, wherein a number of partitions is less than half of the processing capabilities, wherein a number of load processes is equal to the number of partitions, and further comprising determining that a number of sort processes is the smaller of the difference of the processing capabilities available for the sort processes and the number of load processes, and a number of indexes.

3. A computer-implemented method of loading data into a data store connected to a computer, the method comprising the steps of:
   identifying memory constraints;
   identifying processing capabilities; and
   determining a number of load and sort processes to be started in parallel based on the identified memory constraints and processing capabilities, wherein a number of indexes is less than the difference of the total amount of available memory and the amount of memory required for a main process, divided by the amount of memory required for each load and sort process, wherein a number of sort processes is equal to the number of indexes, and further comprising determining that the number of load processes is the smaller of the difference of a total amount of available memory and the amount of memory required for the main process, and the amount of memory for each sort process multiplied by the number of indexes, divided by the memory required for each load process, and a number of partitions.

4. A computer-implemented method of loading data into a data store connected to a computer, the method comprising the steps of:
   identifying memory constraints;
   identifying processing capabilities; and
   determining a number of load and sort processes to be started in parallel based on the identified memory constraints and processing capabilities, wherein the number of partitions is less than the difference of the total amount of available memory and the amount of memory required for a main process, divided by the amount of memory required for each load an sort process, wherein a number of load processes is equal to the number of partitions, and further comprising determining that the number of sort processes is the smaller of the difference of the total amount of available memory, the amount of memory required for the main process, and the amount of memory for each load process multiplied by the number of partitions, divided by the memory required for each sort process, and a number of indexes.

5. A computer-implemented method of loading data into a data store connected to a computer, the method comprising the steps of:
   identifying memory constraints;
   identifying processing capabilities; and
   determining a number of load and sort processes to be started in parallel based on the identified memory constraints and processing capabilities, wherein a number of load processes is equal to a number of sort processes which is equal to the difference of the total amount of available memory available and the amount of memory required for a main process, divided by the amount of memory required for each load and sort process.

6. A computer-implemented method of loading data into a data store connected to a computer, the method comprising the steps of:
   identifying memory constraints;
   identifying processing capabilities; and
   determining a number of load and sort processes to be started in parallel based on the identified memory constraints and processing capabilities, wherein the number of indexes is less than the difference of the total amount of available memory, the amount of memory required for a main process, and the amount of memory required for each load process multiplied by the processing capabilities, divided by the difference of the amount of memory required for each sort process and each load process, wherein a number of sort processes is equal to the number of indexes, and further comprising determining that the number of load processes is the smaller of the difference of the processing capabilities and the number of indexes, and a number of partitions.

7. A computer-implemented method of loading data into a data store connected to a computer, the method comprising the steps of:
- identifying memory constraints;
- identifying processing capabilities; and
- determining a number of load and sort processes to be started in parallel based on the identified memory constraints and processing capabilities, wherein the number of partitions is less than the difference of the sum of the amount of memory required for each sort process multiplied by the processing capabilities, the total amount of memory required for a main process, and the amount of memory required for each load process, divided by the difference of the amount of memory required for reach sort process and each load process, wherein a number of load processes is equal to the number of partitions, and further comprising determining that the number of sort processes is the smaller of the difference of the total amount of available memory, the amount of memory required for the main process, and the amount of memory for each load process multiplied by the number of partitions, divided by the memory required for each sort process, and a number of indexes.

8. A computer-implemented method of loading data into a data store connected to a computer, the method comprising the steps of:
- identifying memory constraints;
- identifying processing capabilities; and
- determining a number of load and sort processes to be started in parallel based on the identified memory constraints and processing capabilities, wherein a number of sort processes is equal to difference of the total amount of available memory, the amount of memory required for a main process, and the amount of memory required for each load process, divided by the difference of the amount of memory required for each sort process and each load process, and wherein the number of load processes is equal to the difference of the processing capabilities and the number of sort processes.

9. An apparatus for executing parallel load operations, comprising:
- a computer having a data store coupled thereto, wherein the data score stores data; and one or more computer programs, performed by the computer, for identifying memory constrains, identifying processing capabilities, and determining a number of load and sort processes to be started in parallel based on the identified memory constraints and processing capabilities, wherein a number of indexes is less than half of the processing capabilities, wherein a number of sort processes is equal to the number of indexes, and further comprising determining that a number of load processes is the smaller of the difference of the processing capabilities available for the load processes and the number of sort processes, and a number of partitions.

10. An apparatus for executing parallel load operations, comprising:
- a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein a number of partitions is less than half of the processing capabilities, wherein a number of load processes is equal to the number of partitions, and further comprising deter mining that a number of sort processes is the smaller of the difference of the processing capabilities available for the sort processes and the number of load processes, and a number of indexes.

11. An apparatus for executing parallel load operations, comprising:
- a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein a number of indexes is less than the difference of the total amount of available memory and the amount of memory required for a main process, divided by the amount of memory required for each load and sort process, wherein a number of sort processes is equal to the number of indexes, and further comprising determining that the number of load processes is the smaller of the difference of a total amount of available memory and the amount of merry required for the main process, and the amount of memory for each sort process multiplied by the number of indexes, divided by the memory required for each load process, and on a number of partitions.

12. An apparatus for executing parallel load operations, comprising:
- a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein the number of partitions is less than the difference of the total amount of available memory and the amount of memory requited for a main process, divided by the amount of memory required for each load and sort process is equal to the number of partitions, and further comprising determining that the number of sort processes is the smaller of the difference of the total amount of available memory, the amount of memory required for the main process, and the amount of memory for each load process multiplied by the number of partitions, divided by the memory required for each sort process, and a number of indexes.

13. An apparatus for executing parallel load operations, comprising:
- a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein a number of load processes is equal to a number of sort processes which is equal to the difference of the total amount of available memory available and the amount of memory required for a main process, divided by the amount of memory required for each load and sort process.

14. An apparatus for executing parallel load operations, comprising:

a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein the number of indexes is less than the difference of the total amount of available memory, the amount of memory required for a main process, and the amount of memory required for each load process multiplied by the processing capabilities, divided by the difference of the amount of memory required for each sort process and each load process, wherein a number of sort processes is equal to the number of indexes, and further comprising determining that the number of load processes is the smaller of the difference of the processing capabilities and the number of indexes and, a number of partitions.

15. An apparatus for executing parallel load operations, comprising:
a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein the number of partitions is less than the difference of the sum of the amount of memory required for each sort process multiplied by the processing capabilities, the total amount of memory required for a main process, and the amount of memory required for each load process, divided by the difference of the amount of memory required for each sort process and each load process, wherein a number of load processes is equal to the number of partitions, and further comprising determining that the number of sort processes is the smaller of the difference of the total amount of available memory, the amount of memory required for the main process, and the amount of memory for each load process multiplied by the number of partitions, divided by the memory required for each sort process, and a number of indexes.

16. An apparatus for executing parallel load operations, comprising:
a computer having a data store coupled thereto, wherein the data store stores data; and one or more computer programs, performed by the computer, for identifying memory constrains, identifying processing capabilities, and determining a number of load and sort processes to be started in parallel based on the identified memory constraints and processing capabilities, wherein a number of sort processes is equal to difference of the total amount of available memory, the amount of memory required for a main process, and the amount of memory required for each load process, divided by the difference of the amount of memory required for each sort process and each load process, and wherein the number of load processes is equal to the difference to the processing capabilities and the number of sort processes.

17. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein a number of indexes is less than half of the processing capabilities, wherein a number of sort processes is equal to the number of sort processes is equal to the number of indexes, and further comprising, determining that a number of load processes is the smaller of the difference of the processing capabilities available for the load processes and the number of sort processes, and a number of partitions.

18. An article of manufacture comprising a program storage medium readable by a computer and embody one or more instructions executable by the computer to perform a method for loading data into a data store connected to a computer, the method comprising the steps of:
identifying memory constraints;
identifying processing capabilities; and
determining a number of load and sort processes, to be started in parallel based on the identified memory constants and processing capabilities, wherein a number of partitions if less than half of the processing capabilities, wherein a number of load processes is equal to the number of partitions, and further comprising deter that a number of sort processes is the smaller of the difference of the processing capabilities available for the sort processes and the number of load processes, and on a number of indexes.

19. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein a number of indexes is less than the difference of the total amount of available memory and the amount of memory required for a main process, divided by the amount of memory required for each load and sort process, wherein a number of sort processes is equal to the number of indexes, and further comprising determining that the number of load processes is the smaller of the difference of a total amount of available memory and the amount of memory required for the main process, and the amount of memory for each sort process multiplied by the number of indexes, divided by the memory required for each load process and, a number of partitions.

20. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein the number of partitions is less than the difference of the total amount of available memory and the amount of memory required for a main process, divided by the amount of memory required for each load and sort process, wherein a number of load processes is equal to the number of partitions, and further comprising determining that the number of sort processes is the smaller of the difference of the total amount of available memory, the amount of memory required for the main process, and the amount of memory for each load process multiplied by the number of partitions, divided by the memory required for each sort process, and a number of indexes.

21. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein a number of load processes is to a number of sort processes which is equal to the difference of the total amount of available memory available and the amount of memory required for a main process, divided by the amount of memory required for each load and sort process.

22. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein the number of indexes is less than the difference of the total amount of available memory, the amount of memory required for a main process, and the amount of memory required for each load process multiplied by the processing capabilities, divided by the difference of the amount of memory required for each sort process and each load process, wherein a number of sort processes is equal to the number of indexes, and further comprising determining that the number of load processes is the smaller of the difference of the processing capabilities and the number of indexes and, a number of partitions.

23. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein the number of partitions is less than the difference of the sum of the amount of memory required for each sort process multiplied by the processing capabilities, the total amount of memory required for a main process, and the amount of memory required for each load process, divided by the difference of the amount of memory required for each sort process and each load process, wherein a number of load processes is equal to the number of partitions, and further comprising determining that the number of sort processes is the smaller of the difference of the total amount of available memory, the amount of memory required for the main process, and the amount of memory for each load process multiplied by the number of partitions, divided by the memory required for each sort process, and a number of indexes.

24. An article of manufacture comprising a program storage medium readable by a computer and embodying one or more instructions executable by the computer to perform a method for loading data into a data store connected to a computer, the method comprising the steps of:
identifying memory constraints;
identifying processing capabilities; and
determining a number of load and sort processes to be started in parallel based on the identified memory constraints and processing capabilities, wherein a number of sort processes is equal to difference of the total amount of available memory, the amount of memory required for a main process, and the amount of memory required for each load process, divided by the difference of the amount of memory required for each sort process and each load process, and wherein number of load processes is equal to the difference of the processing capabilities and the number of sort processes.

* * * * *